(12) United States Patent
Lowrance et al.

(10) Patent No.: US 7,809,700 B2
(45) Date of Patent: Oct. 5, 2010

(54) METHODS AND SYSTEMS FOR VERIFYING THE ACCURACY OF REPORTED INFORMATION

(75) Inventors: Roy E. Lowrance, New York, NY (US); Dwight J. Gibbs, Alexandria, VA (US)

(73) Assignee: Capital One Financial Corporation, Falls Church, VA (US)

( * ) Notice: Subject to any disclaimer, the term of this patent is extended or adjusted under 35 U.S.C. 154(b) by 1587 days.

(21) Appl. No.: 10/820,797

(22) Filed: Apr. 9, 2004

(65) Prior Publication Data

US 2005/0234908 A1   Oct. 20, 2005

(51) Int. Cl.
  *G06F 7/00* (2006.01)
  *G06F 17/00* (2006.01)
(52) U.S. Cl. .................. 707/698; 707/697; 707/687
(58) Field of Classification Search .............. 707/8, 707/698; 713/179
  See application file for complete search history.

(56) References Cited

U.S. PATENT DOCUMENTS

| | | | |
|---|---|---|---|
| 5,619,571 A | 4/1997 | Sandstrom et al. | 380/4 |
| 5,699,427 A | 12/1997 | Chow et al. | 380/3 |
| 5,748,738 A | 5/1998 | Bisbee et al. | 380/25 |
| 5,812,669 A | 9/1998 | Jenkins et al. | 380/25 |
| 5,948,103 A | 9/1999 | Fukuzaki | 713/200 |
| 6,021,491 A | 2/2000 | Renaud | 713/179 |
| 6,601,172 B1 | 7/2003 | Epstein | 713/178 |
| 2001/0039545 A1 | 11/2001 | Nishizawa | |
| 2001/0054144 A1 | 12/2001 | Epstein et al. | |
| 2002/0019827 A1 | 2/2002 | Shiman et al. | |
| 2002/0138744 A1 | 9/2002 | Schleicher et al. | |
| 2003/0084298 A1 | 5/2003 | Messerges et al. | |
| 2003/0120601 A1 | 6/2003 | Ouye et al. | |

(Continued)

FOREIGN PATENT DOCUMENTS

WO   WO 00/42748   7/2000

(Continued)

OTHER PUBLICATIONS

Yunliang Yu, "Centralized Intrusion Detection Using Tripwire," Jan. 6, 2004, from www.math.duke.edu.

(Continued)

*Primary Examiner*—Neveen Abel-Jalil
*Assistant Examiner*—Paul Kim
(74) *Attorney, Agent, or Firm*—Finnegan, Henderson, Farabow, Garrett & Dunner LLP (57) ABSTRACT

Systems and methods are disclosed for verifying the accuracy of reported information. The systems and methods may include generating a hash based on ingredient data related to the creation of a report, storing the hash and the ingredients in a database, the hash being associated with the ingredient data in the database, and outputting the report, the report including the hash. Furthermore, the systems and methods may include receiving an input, the input being based on a first hash of ingredient data related to the creation of the report and determining if the database contains a record corresponding to the input. Moreover, the systems and methods may include outputting information contained in the record corresponding to the input if it was determined that the database contains the record corresponding to the input, the information contained in the record comprising the ingredient data.

27 Claims, 5 Drawing Sheets

U.S. PATENT DOCUMENTS

| | | |
|---|---|---|
| 2003/0131240 A1 | 7/2003 | Greene et al. |
| 2003/0145199 A1 | 7/2003 | Miller et al. |
| 2003/0196086 A1 | 10/2003 | Murakami et al. |
| 2003/0196094 A1* | 10/2003 | Hillis et al. ................. 713/179 |

FOREIGN PATENT DOCUMENTS

| | | |
|---|---|---|
| WO | WO 01/18633 A1 | 3/2001 |

OTHER PUBLICATIONS

EB/EDI*SEC: The XML & e-business security, published by *easeit*.

Entrust-SAP Solution Guide, Entrust Technologies, Jun. 2000.

Tuan T. Phan, "Technical Considerations for the Validation of Electronic Spreadsheets for Complying with 21 CFR Part 11," Pharmaceutical Technology, Jan. 2003, pp. 50-62.

* cited by examiner

FIG. 1A

| A hash | A user's name that created the report. | A date and time the report was created. | Query statement that generated the report. | A format of the report. | Data comprising or used to generate the report. |

METHODS AND SYSTEMS FOR VERIFYING THE ACCURACY OF REPORTED INFORMATION

BACKGROUND OF THE INVENTION

I. Field of the Invention

The present invention generally relates to verifying the accuracy of reported information. More particularly, the present invention relates to systems and methods for verifying the accuracy of reported information based on data related to the creation of the reported information.

II. Background Information

Business application software packages have become so universally well known and ubiquitous that they have become a fundamental element in running a business and distributing business information. These business application software packages, for example, may include software for producing spreadsheets, presentations, and other types of reports. The output or reports generated by such business application software packages may be widely distributed among those within or outside a common enterprise.

To help ensure that a report has not been tampered with, such as by a person without authorization to modify the report, techniques exist for protecting the report, such as by password protection or data encryption. However, current application software is unable to verify the accuracy of the generated information included within the report itself. For example, when viewing the output of business application software packages, it is not possible to tell with certainty where the referenced data came from, what databases were used, when the report was run, who ran it, or with what database queries to identify the data. Verifying the accuracy of such reported data may be very useful to those managing or regulating an enterprise.

In view of the foregoing, there is a need for systems and methods for verifying the accuracy of reported information. For example, a need exists for verifying the accuracy of reported information in such a way as to help an individual or entity understand where data corresponding to a report came from and that the data is accurate.

SUMMARY OF THE INVENTION

Consistent with embodiments of the present invention, systems and methods are disclosed for efficiently verifying the accuracy of reported information.

In accordance with one embodiment, a method for generating verifiable reported information comprises generating a hash based on ingredient data, wherein the ingredient data are related to the generation of a report including the reported information, storing the hash and the ingredient data in an ingredient database, the hash being associated with the ingredient data in the ingredient database, and outputting the report, the report including the report information and the generated hash stored in the database, wherein the stored hash and the ingredient data may be subsequently accessed using the hash included in the report to verify the report information.

In accordance with another embodiment, a method for verifying reported information comprises receiving an input, the input being based on a first hash of ingredient data related to the generation of a report including the reported information, determining if an ingredient database contains a record corresponding to the received input, and outputting ingredient data contained in the record corresponding to the input if it was determined that the ingredient database contains a record corresponding to the input, wherein the outputted ingredient data is used to verify the reported information included in the report.

In accordance with yet another embodiment, a system for generating verifiable reported information comprises a memory storage for maintaining a database and a processing unit coupled to the memory storage, wherein the processing unit is operative to generate a hash based on ingredient data, wherein the ingredient data is related to the generation of a report including the reported information, store the hash and the ingredient data in an ingredient database, the hash being associated with the ingredient data in the ingredient database, and output the report, the report including the report information and the generated hash stored in the database, wherein the stored hash and the ingredient data may be subsequently accessed using the hash included in the report to verify the report information.

In accordance with yet another embodiment, a system for verifying the accuracy of reported information comprises a memory storage for maintaining a database and a processing unit coupled to the memory storage, wherein the processing unit is operative to receive an input, the input being based on a first hash of ingredient data related to the generation of a report including the reported information, determine if an ingredient database contains a record corresponding to the received input, and output ingredient data contained in the record corresponding to the input if it was determined that the ingredient database contains a record corresponding to the input, wherein the outputted ingredient data is used to verify the reported information included in the report.

In accordance with yet another embodiment, a computer-readable medium comprising a set of instructions which when executed perform a method for generating verifiable reported information comprises generating a hash based on ingredient data, wherein the ingredient data is related to the generation of a report including the reported information, storing the hash and the ingredient data in an ingredient database, the hash being associated with the ingredient data in the ingredient database, and outputting the report, the report including the report information and the generated hash stored in the database, wherein the stored hash and the ingredient data may be subsequently accessed using the hash included in the report to verify the report information.

In accordance with yet another embodiment, a computer-readable medium comprising a set of instructions which when executed perform a method for verifying the accuracy of reported information comprises receiving an input, the input being based on a first hash of ingredient data related to the generation of a report including the reported information, determining if an ingredient database contains a record corresponding to the received input, and outputting ingredient data contained in the record corresponding to the input if it was determined that the ingredient database contains a record corresponding to the input, wherein the outputted ingredient data is used to verify the reported information included in the report.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Systems and methods consistent with the invention may verify the accuracy of reported information. Embodiments of the invention may provide a single point or "portal" for obtaining reported information, such as, for example, an intranet page on an enterprises network or an Internet website. The aforementioned types of data access points are exemplary and others may comprise the portal. This portal may support both predefined and user definable reports. For example, through the portal a user may access a report generation module connected to an information database. The report generation module may allow the user to generate reports based on or using the information stored in the information database.

The report generation module may allow the user to select a "return hash" option. By selecting this option, a hash software module may generate a hash or other encoded data based on ingredient data related to the generated report. As used herein, the term "hash" may broadly refer to any type of encoded output associated with data related to the generation of the report. It may include the property that a change in the data related to the generation of the report may be likely to cause a change in the hash. For example, the hash may comprise a fixed string of characters generated from data related to the generation of the report. The term "hash," however, is not limited to a hash produced by a conventional hashing algorithm, but, as noted above, may comprise any unique identifier generated using a variety of techniques.

One possibility is to make the hash identical to all of the data related to the generation of the report. Some hash functions produce shorter hash values than needed to represent all of the data related to the generation of the report. These include, for example, but are not limited to MD-2, MD-4, MD-5, HMAC, RIPEMD-128, RIPEMD-160, SHA, SHA1. Further, the term "ingredient data," as used herein, broadly refers to any data related to the generation of a report, such as, for example, the user who generated the report, the query the user ran to obtain or identify information contained in the report, the date and time the query was run, the version level for the contents of any databases accessed, a query statement that generated the report (for example, a structured query language (SQL) statement), a format of the report, and data comprising the report. The hash may then be stored in a hash database and returned with the resulting ingredient data for the generated report. Furthermore, the report generation module may include the hash in the generated report or in any other document referencing the data included in the report.

Consistent with the invention, a person may receive the generated report including the hash. To verify the accuracy of the information included in the report, the person may provide the hash to the portal. The portal may search a database for a record corresponding to the provided hash, re-hash ingredient data from the record found (if one is found), and compare the resulting re-hash to the hash entered. If the comparison results in a match, the portal may display the "ingredient data" associated with the hash or a message verifying the report's accuracy. If the hashes do not match or the hash is not found, an error message may be displayed. Furthermore, to ensure that data are not changed, the report generation module may, for example, digitally sign the generated report. Accordingly, the person receiving the report may verify the digital signature. If the electronic version of the report has been changed in any way, the verification may fail.

An embodiment consistent with the invention may comprise a system for verifying the accuracy of reported information. The system may comprise a memory storage for maintaining a database and a processing unit coupled to the memory storage. The processing unit may be operative to generate a hash based on ingredient data related to the creation of a report, store the hash and the ingredient data in a database, the hash being associated with the ingredient data in the database, and output the report including the hash. Moreover, the processing unit may be operative to receive an input that may be based on a first hash of ingredient data related to the creation of a report and determine if a database contains a record corresponding to the input. Furthermore the processing unit may be operative to output information contained in the record corresponding to the input if it was determined that the database contains the record corresponding to the input, the information contained in the record comprising the ingredient data.

Figure 1A:
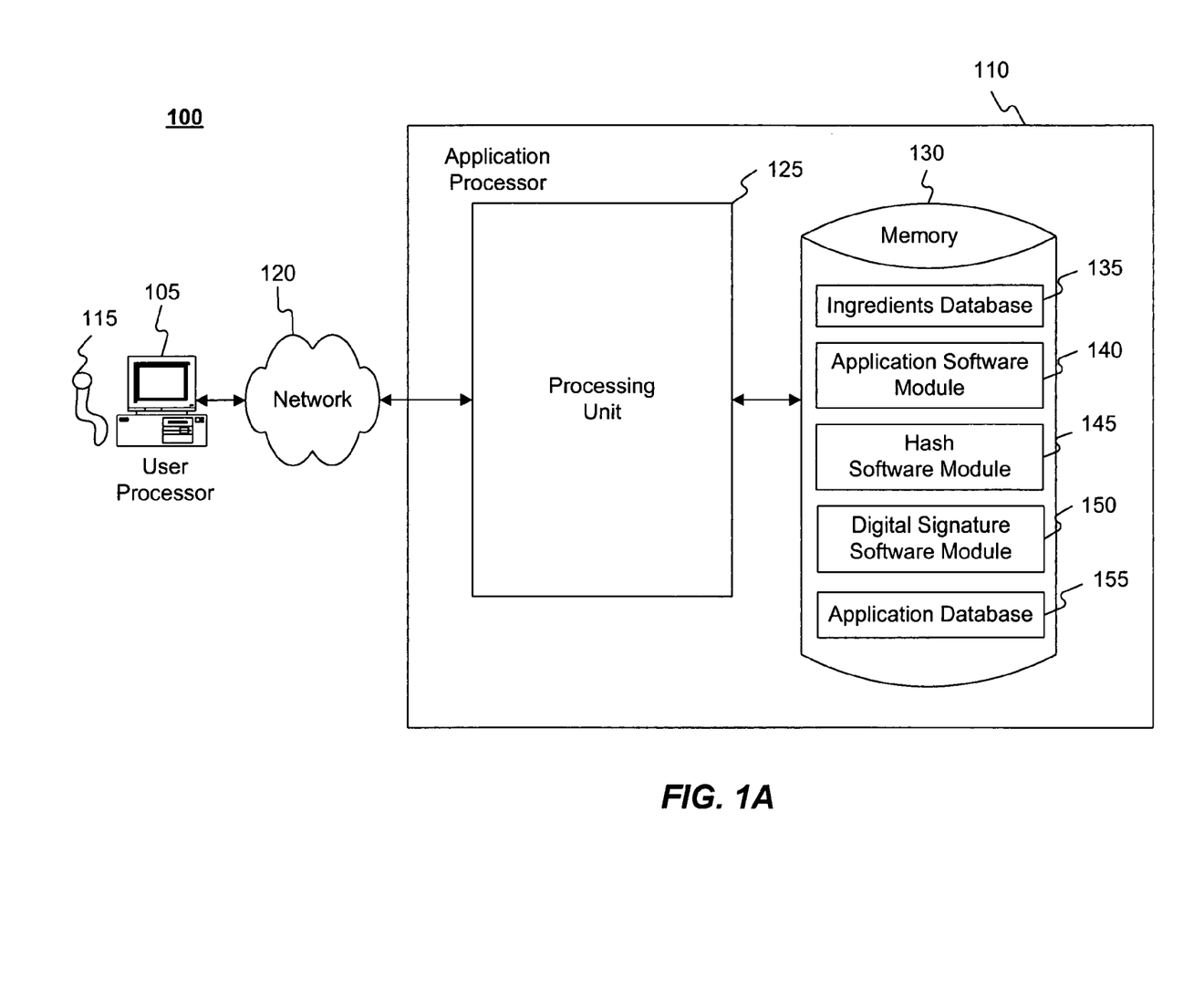
FIG. 1A is a block diagram of an exemplary information verification system consistent with an embodiment of the present invention.

Consistent with an embodiment of the present invention, the aforementioned memory, processing unit, and other components may be implemented in an information verification system, such as the exemplary information verification system 100 of FIG. 1. Any suitable combination of hardware, software and/or firmware may be used to implement the memory, processing unit, or other components. By way of example, the memory, processing unit, or other components may be implemented with any of a user processor 105 or an application processor 110, in combination with system 100. The aforementioned system and processors are exemplary and other systems and processors may comprise the aforementioned memory, processing unit, or other components, consistent with embodiments of the present invention.

By way of a non-limiting example, FIG. 1A illustrates system 100 in which the features and principles of the present invention may be implemented. As illustrated in the block diagram of FIG. 1, system 100 may include user processor 105, application processor 110, a user 115, and a network 120. User 115 may be an individual, for example, desiring to verify information of a report using user processor 105. User 115 may also be an organization, enterprise, electronic data processing system, or any other entity having such desires.

Application processor 110 may include a processing unit 125 and a memory 130. Memory 130 may include an ingredient database 135, an application software module 140, a hash software module 145, a digital signature software module 150, and an application database 155. The software modules 140, 145, and 150 residing on memory 130 may be executed on processing unit 125 and may access ingredient database 135 and/or application database 155.

Application software module 140 may include any program capable of producing a report or other document and may be remotely executable on application processor 110 by user 115 over network 120. For example, application software module 140 may comprise, but is not limited to, commercially available spreadsheet or presentation software, word processor software, database management software, and other types of document application software. When producing a report, module 140 may access or import data stored in application database 155 or allow a user to import other data (not necessarily in database 155) for including in the generated report.

Application database 155 may thus comprise a centralized data repository for storing report data to be used in generating reports. Application database 155 may be accessible by a plurality of users associated with an enterprise or other organization and the enterprise or other organization may maintain application database 155 and insure its security. Further, if application software module 140 comprises a database management software package, such as ACCESS available from Microsoft Corporation of Redmond Wash., for example, user 115 may enter a query statement or statements (e.g., an SQL query) directing application server 110 to query application database 155. Module 140 may then use the results of such queries when generating the report.

Ingredients database 135 may then store ingredient data related to the report generated by application software module 140. For example, the ingredient data may include the user who generated the report, the SQL query the user ran to obtain or identify information contained in the report, the date and time the query was run, a query statement that generated the report (for example, a structured query language (SQL) statement), a format of the report, and data comprising the report. Application processor 110 may then package the ingredient data for a report generated by module 140 into a corresponding record.

Figure 1B:
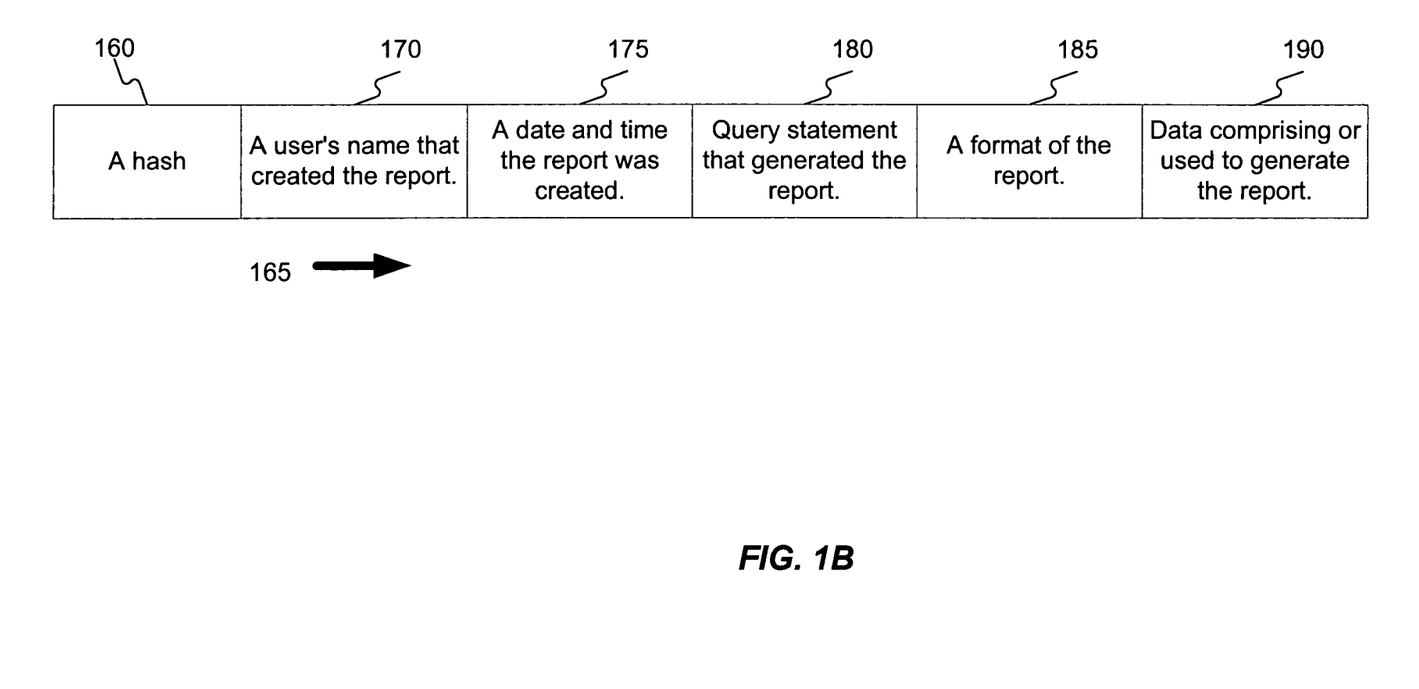
FIG. 1B illustrates an exemplary data structure for a database consistent with an embodiment of the present invention.

FIG. 1B illustrates an exemplary ingredient database record for storage in ingredients database 135. Ingredient database 135 contains a record for each generated report containing a hash. As shown in FIG. 1B, a record may include a hash field 160, containing the value of a hash, and ingredients data fields 165. The ingredients data fields 165 may include a user field 170 corresponding to a user who generated the report, a date and time field 175 corresponding to the date and time the report was generated, a query statement field 180 corresponding to the one or more query statements that generated the report, a format field 185 corresponding to the report's format, and a data field 190 corresponding to the data comprising or used to generate the report. For example, data field 190 may include the data extracted from application database 155 for generating the report, an indication that the data came from application database 155, or other data included in the report. The aforementioned fields are exemplary and ingredient database 135 may comprise other field types containing other data types.

Hash software module 145 may generate a hash based on the ingredient record corresponding to the generated report. Hash software module 145 may, for example, generate a fixed string of characters from a the report's ingredient data in such a way that it is difficult to reproduce the ingredient data from the hash. For instance, hash software module 145 may use secure hash algorithm-1 (SHA-1), a popular one-way hash algorithm. Or hash software module 145 may use message digest 5 (MD-5), another popular one-way hash function. SHA-1 and MD-5 are exemplary and other hash or encrypting algorithms capable of producing a unique identifier may be used. Notwithstanding, the hash may comprise any unique identifier to be associated with a particular report and is not necessarily limited to data produced by a conventional hashing algorithm. In any case, upon generating the hash, software module 145 may then add the generated hash to the corresponding report generated by application software module 140. If a non-unique hash is produced, however, a verifier may review the ingredient data to determine if the report contents are valid.

Digital signature software module 150 may comprise any software capable of producing a digital signature on a report and capable of reading and verifying a digital signature associated with the report. A digital signature may guarantee that a file has not been altered, as if it were carried in an electronically sealed envelope, for example. The "signature" may, for example, comprise an encrypted digest (e.g., a one-way hash function) of the report or other document. A recipient of the digital signature may decrypt the encrypted digest that was sent and may also re-compute the digest from the received file. If the digests match, the file may be proved intact and tamper-free from the sender. For example, digital signature software module 150 having the above or similar functionality may be available from Entrust Inc. of Addison, Tex.

User processor 105 or application processor 110 ("the processors") included in system 100 may be implemented using a personal computer, network computer, mainframe, or other similar computer-based workstation. The processors may comprise any type of computer operating environment, such as hand-held devices, multiprocessor systems, microprocessor-based or programmable sender electronic devices, minicomputers, mainframe computers, and the like. The processors may also be practiced in distributed computing environments where tasks are performed by remote processing devices. Furthermore, any of the processors may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processor may comprise other systems or devices.

Network 120 may comprise, for example, a local area network (LAN) or a wide area network (WAN) or a combination of such networks. Such networking environments are commonplace in offices, enterprise-wide computer networks, intranets, and the Internet, and are known by those skilled in the art. When a LAN is used as network 120, a network interface located at any of the processors may be used to interconnect any of the processors. When network 120 is implemented in a WAN networking environment, such as the Internet, the processors may typically include an internal or external modem (not shown) or other means for establishing communications over the WAN. Further, in utilizing network 120, data sent over network 120 may be encrypted to insure data security by using known encryption/decryption techniques.

In addition to utilizing a wire line communications system as network 120, a wireless communications system, or a combination of wire line and wireless may be utilized as network 120 in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio, and spread spectrum radio. The processors in the wireless environment can be any mobile terminal, such as the mobile terminals described above. Wireless data may include, but is not limited to, paging, text messaging, e-mail, Internet access and other specialized data applications specifically excluding or including voice transmission.

System 100 may also transmit data by methods and processes other than, or in combination with, network 120. These methods and processes may include, but are not limited to, transferring data via diskette, CD ROM, facsimile, conventional mail, an interactive voice response system (IVR), or via voice over a publicly switched telephone network.

Figure 2:
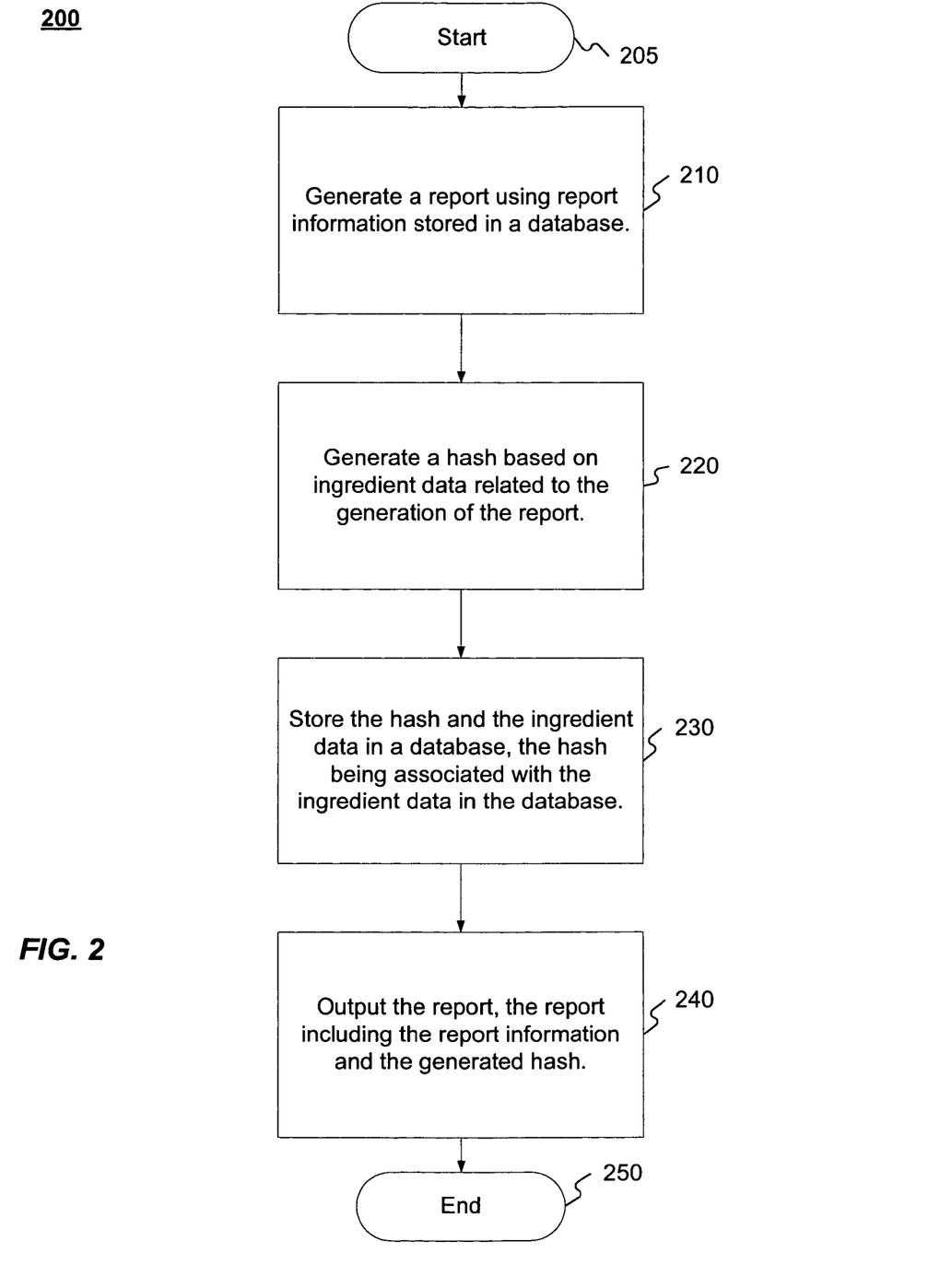
FIG. 2 is a flow chart of an exemplary method for generating verifiable reported information consistent with an embodiment of the present invention.

FIG. 2 is a flow chart setting forth the general stages involved in an exemplary method consistent with the invention for generating verifiable reported information using system 100 of FIG. 1. Exemplary ways to implement the stages of exemplary method 200 will be described in greater detail below. Exemplary method 200 may begin at starting block 205 and proceed to stage 210 where application processor 110 may generate a report using, for example, report information stored in application database 155. The report can be generated using a software application executed remotely over network 120 on application processor 110 or locally executed on user processor 105. Either way, application database 155 residing in memory 130 of application processor 110 may be accessed. For example, user 115, using user processor 105, may access application processor 110 over network 120 and execute application software module 140.

As described above, application software module 140 may comprise a database management software package. User 115 may enter a query statement or statements into user processor 105 directing application server 110 to query application database 155. The results of such a query may be produced in, used as a basis for, or otherwise reflected in the generated report. Accordingly, user 115 may then cause application processor 110 to generate the report that may include, for example, a graph, a chart, a table, or a spreadsheet reflecting the data obtained from database 155. The aforementioned are exemplary and the report may include any document element.

From stage 210, where application processor 110 generates the report, exemplary method 200 may advance to stage 220 where application processor 110 may generate a hash based on ingredient data related to the generation of the report. As described above, application processor 110 generates a record of the ingredient data corresponding to the generated report as part of the report generation process, and stores the ingredient record in database 135. To generate the hash, a user 115 may use processor 105 to access application processor 110 over network 120 and execute hash software module 145 to generate the hash. Hash software module 145 may then generate the hash based on the ingredient record corresponding to the generated report.

Once application processor 110 generates the hash based on the ingredient data related to the creation of the report in stage 220, exemplary method 200 may continue to stage 230 where application processor 110 may store the hash in the corresponding ingredient record in ingredient database 135. For instance, hash software module 145 may associate the hash with the corresponding ingredient data of database 135. As described above, an exemplary ingredient record is shown in FIG. 1B, which illustrates a hash 160 associated with corresponding ingredient data 165.

After application processor 110 stores the ingredient record (i.e., the hash and the ingredient data) in ingredient database 135 in stage 230, exemplary method 200 may proceed to stage 240 where application processor 110 may output the report including the report information and the generated hash. For example, user 115 may access application processor 110 over network 120 via processor 105, and cause processor 110 to output the report including the hash. During this output process, processor 110 may query ingredient database 135 for the corresponding hash 160 and include an indicia corresponding to hash 160 with the generated report. For example, hash 160 (or indicia corresponding to it) may be included within a printed version of the report, in a separate file accompany the report, in a header of the report, or in any other way. The indicia may comprise, for example, a field containing a numeric or alphanumeric value, a bar code, a PDF417 code, a MAXICODE, DATAMATRIX code, any machine readable code, or any element capable of communicating the value of the hash. Hash 160 may be in human readable form in the ingredients file. However, when used, it may be represented in both a human readable form, for example, alpha numeric or a non-human readable form, for example, bar code.

Moreover, the hash may be commutated electronically, comprising a hyperlink or other user selectable element addressing application processor 110 (for example, a network link address to processor 110.) Thus, a user may access processor 110 by selecting the hyperlink (or other user selectable element), with the hash value being automatically provided to application processor 110. The aforementioned are exemplary and application processor 110 may output the report including the report information and the generated hash in any way. Furthermore, while the hash value may be printed on the report itself (as described above), the hash value may be associated with the report in any verifiable way, such as by putting the report and the hash value into a secure envelope.

Furthermore, application software module 140 may cause application processor 110 to output an electronic copy of the report including a verifiable digital signature. The electronic copy of the report may be configured to include a user selectable element. In addition, digital signature software module 150 may be configured to verify the digital signature included with the electronic copy of the report when, for example, user 115 selects the user selectable element. A digital signature may guarantee that a file has not been altered and may, for example, comprise an encrypted digest (one-way hash function) of the report or other file. As described further below with respect to FIG. 3, a recipient of the digital signature may decrypt the encrypted digest that was sent and may also re-compute the digest from the received file. If the digests match, the file may be proved intact and tamper-free from the sender.

As part of stage 240, application processor 110 may generate and output the report in any type of report format, including ASCII (American Standard Code for Information Interchange), EBCDIC (Extended Binary-Coded Decimal Interchange Code), Unicode or other character strings, Comma Separated Values (CSV), SGML (Standard Generalized Markup Language), Extensible Markup Language (XML), HyperText Markup Language (HTML), Portable Document Format (PDF), Joint Photographic Experts Group (JPEG), and Graphics Interchange Format (GIF), word processing documents (for example, Microsoft Word, Lotus Word Pro, Corel WordPerfect, OpenOffice Writer, and the like), spreadsheet files (for example, Microsoft Excel, Lotus 1-2-3, Corel Quattro Pro, OpenOffice Calc, and the like), presentation files (for example, Microsoft PowerPoint, Lotus Freelance Graphics, Corel Presentations, OpenOffice Impress, and the like.) The aforementioned formats are exemplary and others may be used in generating the report and hash. After outputting the generated report and hash, exemplary method 200 may then end at stage 250.

Figure 3:
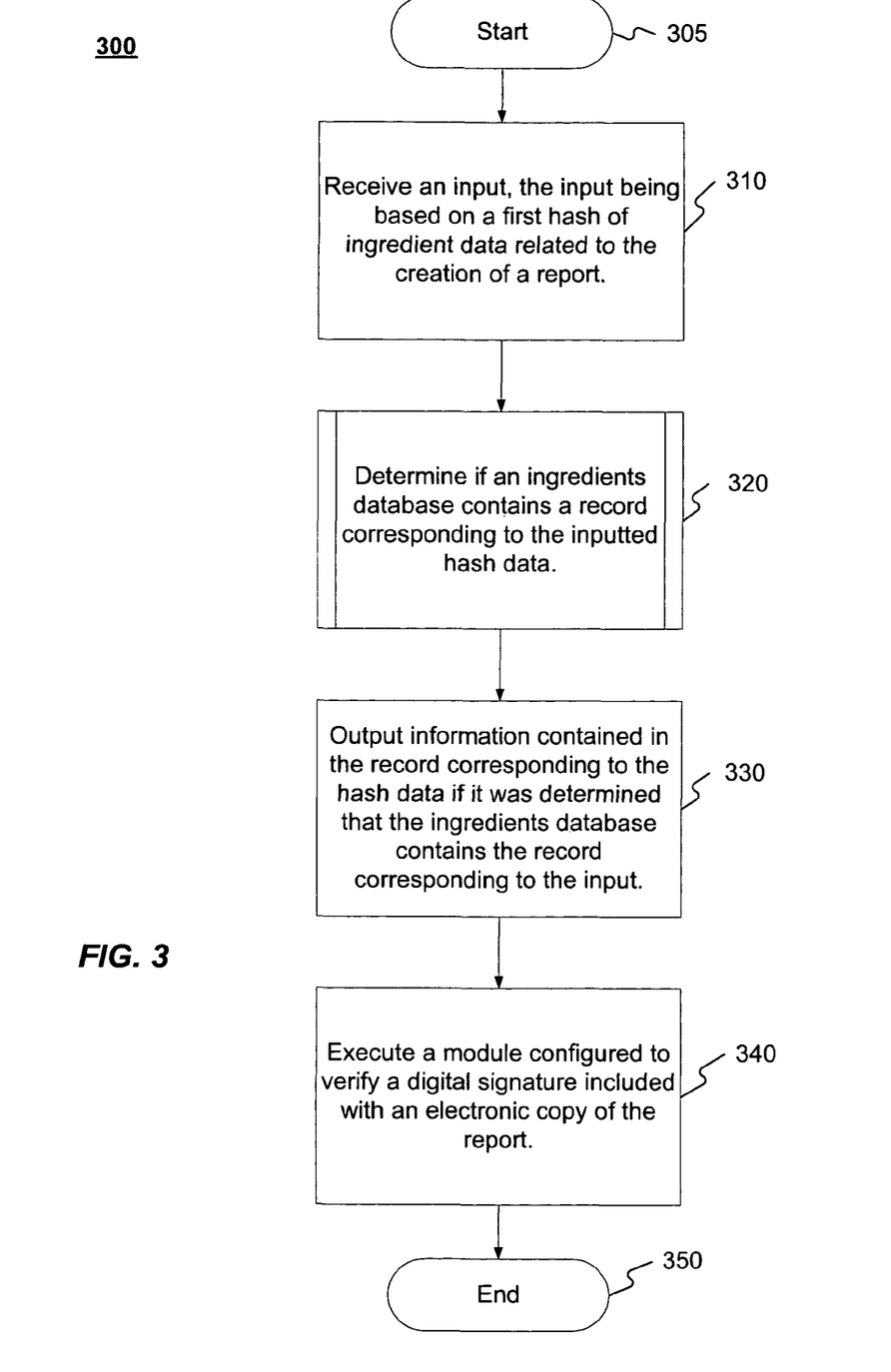
FIG. 3 is a flow chart of an exemplary method for verifying the accuracy of reported information consistent with an embodiment of the present invention.

FIG. 3 is a flow chart setting forth the general stages involved in exemplary method for verifying the accuracy of reported information consistent with the invention. Exemplary ways to implement the stages of exemplary method 300 will be described in greater detail below. Exemplary method 300 may begin at starting block 305 and proceed to stage 310 where application processor 110 may receive an input based on a hash (e.g., hash 160) included in a generated report. A user may provide the hash to processor 110 in a variety of ways. For example, a user 115 may visually read the indicia corresponding to the hash on a printed version of the report, in a separate file accompany the report, in a header of the report, or in any other way, and then communicate the hash indicia to processor 110 via network 120. For instance, as noted above, the user may automatically communicate the hash via a hyperlink or other user selectable element addressing application processor 110. Further, if the indicia comprises, for example, a bar code, a PDF417 code, a MAXICODE, DATAMATRIX code, or other machine readable code, user 115 may use a scanner or other device capable of reading the indicia. Regardless of how user 115 reads the indicia, user 115 may enter the input corresponding to the read indicia into user processor 115 and send the input to application processor 110 over network 120.

Once application processor 110 receives the input in stage 310, exemplary method 300 may continue to exemplary subroutine 320 where application processor 110 may determine if the database contains an ingredient record corresponding to the inputted hash information. Exemplary ways to implement the stages of exemplary subroutine 320 will be described in greater detail below with respect to FIG. 4.

After application processor 110 determines if the database contains the ingredient record corresponding to the input in exemplary subroutine 320, exemplary method 300 may proceed to stage 330 where application processor 110 may output verification information based on that record. Moreover, multiple ingredient records may be identified with the same hash code. In this case, user 115 may check the several ingredient lists manually. The verification information may, for example, contain the report's ingredient data included in the ingredient record, as shown in FIG. 1B. Alternatively, the verification information may simply affirm or deny the verification. Application processor 110 may then output the verification information through user processor 105 accessed via network 120.

Alternative embodiments consistent with the invention may also verify a report by using a digital signature or other type of document verification or security tool. In such embodiments, exemplary method 300 may advance to stage 340 where application processor 110 may execute a module configured to verify a digital signature included with an electronic copy of the report. For example, an electronic version of the generated report may include a user hyperlink, icon, or other selectable element associated with the digital signature. User 115 may then select a hyperlink, icon, or other user selectable element displayed on user processor 105 that may cause a digital signature decryption module to be executed on user processor 105 or on application processor 110 (via network 120), such as module 150. The digital signature decryption module may decrypt the digital signature included with the electronic copy of the report and may also compute a digest from the electronic copy of the report. If the digital signature included with the electronic copy of the report and the digest match, the electronic copy of the report may be proved intact and tamper-free from the sender. After application processor 110 executes the module configured to verify the digital signature in stage 340, exemplary method 300 may end at stage 350.

Figure 4:
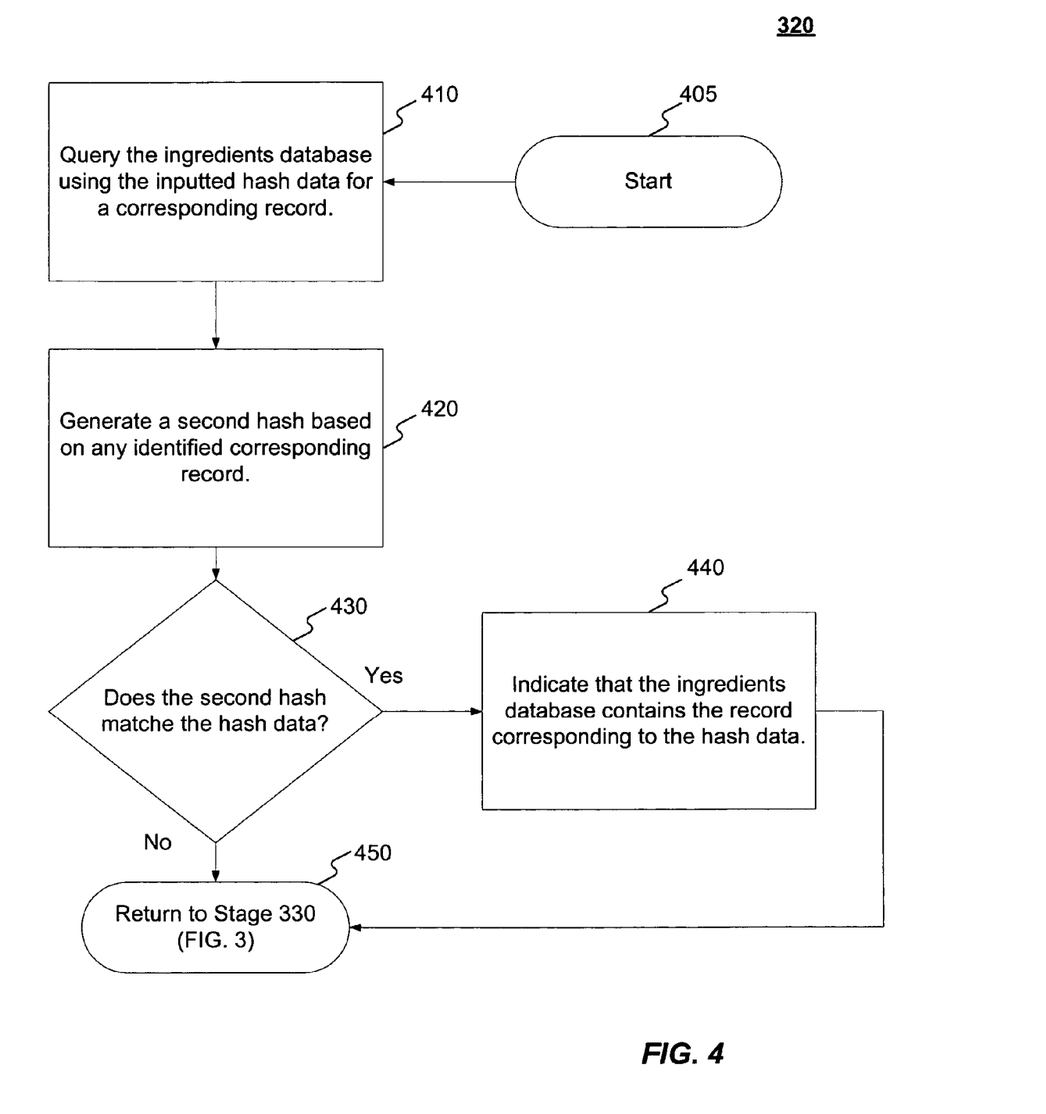
FIG. 4 is a flow chart of an exemplary subroutine used in the exemplary method of FIG. 3 for determining if a database contains a record corresponding to an input consistent with an embodiment of the present invention.

FIG. 4 describes exemplary subroutine 320 of FIG. 3 for determining if ingredients database 135 contains a record corresponding to the input received from the user. Exemplary subroutine 320 may begin at starting block 405 and proceeds to stage 410 where application processor 110 may query ingredients database 135 for a record corresponding to the inputted hash indicia. For example, hash software module 145 may query ingredient database 135 using the inputted hash indicia.

From stage 410, where application processor 110 queries the database using the input, exemplary subroutine 320 may advance to stage 420 where application processor 110 may generate a second hash based on any record identified as part of stage 410. For example, hash software module 145 may generate a second hash based on ingredient data 165 of an identified ingredient record.

Once application processor 110 generates the second hash based on the identified corresponding record in stage 420, exemplary subroutine 320 may continue to decision block 430 where application processor 110 may determine if the second hash matches the inputted hash indicia. For example, hash software module 145 may compare the second hash with the input to determine if they match. Comparing the second hash on the ingredients may provide a confirmation that the ingredients have not been tampered, for example, the name or date for the report has not been changed. While someone could change the contents, re-hash them, and change the hash, this would be more difficult to do than just changing the ingredients themselves. This tends to make the system more tamper resistant.

From decision block 430, if application processor 110 determines that the second hash matches the input, exemplary subroutine 320 may proceed to stage 440 where application processor 110 may indicate that the database contains the record corresponding to the input. For example, hash software module 145, after determining a positive match between the second hash and the inputted hash indicia, may indicate that ingredient database 135 contains the record corresponding to the input. Once application processor 110 indicates that the database contains the record corresponding to the input in stage 440, or if application processor 110 determines that the second hash does not match the input at decision block 430, exemplary subroutine 320 may continue to stage 450 and return to stage 330 of FIG. 3.

As described above, systems and methods consistent with the invention may allow users to verify the accuracy of reported information, as well as obtain information about how the reported information was generated. While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for generating verifiable report information, the method comprising:
    retrieving report information from a central data repository using one or more query statements;
    generating a report using the report information;
    generating a hash based on ingredient data related to the generation of the report, wherein the ingredient data comprises the report information, the one or more query statements, and at least one of a date and time the report was generated and a version of the report information;
    storing the hash and the ingredient data in an ingredient database, the hash being associated with the ingredient data in the ingredient database; and
    outputting the report, the report including the report information and a copy of the generated hash stored in the database, wherein the stored hash and the ingredient data may be subsequently accessed using the copy of the hash included in the report to verify the report information.

2. The method of claim 1, further comprising generating the report using a software application remotely executable over a network.

3. The method of claim 1, wherein the one or more query statements comprises at least one of a structured query language (SQL) statement and a data access language statement.

4. The method of claim 3, wherein the one or more query statements is based on a format comprising at least one of ASCII (American Standard Code for Information Interchange), EBCDIC (Extended Binary-Coded Decimal Interchange Code), Unicode or other character strings, Comma Separated Values (CSV), SGML (Standard Generalized Markup Language), Extensible Markup Language (XML), HyperText Markup Language (HTML), Portable Document Format (PDF), Joint Photographic Experts Group (JPEG), and Graphics Interchange Format (GIF), a word processing document format, a spreadsheet file format, and a presentation file format.

5. The method of claim 1, wherein the ingredient data indicates how the report was generated.

6. The method of claim 1, wherein the report comprises at least one of a graph, a chart, a table, a spreadsheet, a word processing file, a presentation file, and a text file.

7. The method of claim 1, wherein outputting the report further comprises providing an electronic copy of the report including a verifiable digital signature.

8. The method of claim 7, wherein the electronic copy of the report is configured to include a user selectable element wherein a module configured to verify the digital signature included with the electronic copy of the report is executed when the user selectable element is selected.

9. The method of claim 8, wherein the module is remotely executable over a network.

10. A system for generating verifiable report information, the system comprising:
    a memory storage for maintaining a database; and
    a processing unit coupled to the memory storage, wherein the processing unit is operative to
    retrieve report information from a central data repository using one or more query statements;
    generate a report using the report information;
    generate a hash based on ingredient data related to the generation of the report, wherein the ingredient data comprises the report information, the one or more query statements, and at least one of a date and time the report was generated and a version of the report information;
    store the hash and the ingredient data in an ingredient database, the hash being associated with the ingredient data in the ingredient database; and
    output the report, the report including the report information and a copy of the generated hash stored in the database, wherein the stored hash and the ingredient data may be subsequently accessed using the copy of the hash included in the report to verify the report information.

11. The system of claim 10, further comprising the processing unit being operative to generate the report using a software application remotely executable over a network.

12. The system of claim 10, wherein the one or more query statements that generated the report comprises at least one of a structured query language (SQL) statement and a data access language statement.

13. The system of claim 12, wherein the one or more query statements is based on a format comprising at least one of ASCII (American Standard Code for Information Interchange), EBCDIC (Extended Binary-Coded Decimal Interchange Code), Unicode or other character strings, Comma Separated Values (CSV), SGML (Standard Generalized Markup Language), Extensible Markup Language (XML), HyperText Markup Language (HTML), Portable Document Format (PDF), Joint Photographic Experts Group (JPEG), and Graphics Interchange Format (GIF), a word processing document format, a spreadsheet file format, and a presentation file format.

14. The system of claim 10, wherein the ingredient data indicates how the report was generated.

15. The system of claim 10, wherein the report comprises at least one of a graph, a chart, a table, and a spreadsheet, a word processing file, a presentation file, and a text file.

16. The system of claim 10, wherein the processing unit is further operative to provide an electronic copy of the report including a verifiable digital signature.

17. The system of claim 16, wherein the electronic copy of the report is configured to include a user selectable element wherein a module configured to verify the digital signature included with the electronic copy of the report is executed when the user selectable element is selected.

18. The system of claim 17, wherein the module is remotely executable over a network.

19. A computer-readable medium comprising a set of instructions which when executed perform a method for generating verifiable report information, the method comprising:
    retrieving report information from a central data repository using one or more query statements;

generating a report using the report information;

generating a hash based on ingredient data related to the generation of the report, wherein the ingredient data comprises the report information, the one or more query statements, and at least one of a date and time the report was generated and a version of the report information;

storing the hash and the ingredient data in an ingredient database, the hash being associated with the ingredient data in the ingredient database; and outputting the report, the report including the report information and a copy of the generated hash stored in the database, wherein the stored hash and the ingredient data may be subsequently accessed using the copy of the hash included in the report to verify the report information.

20. The computer-readable medium of claim 19, further comprising generating the report using a software application remotely executable over a network.

21. The computer-readable medium of claim 19, wherein the one or more query statements that generated the report comprises at least one of a structured query language (SQL) statement and a data access language statement.

22. The computer-readable medium of claim 21, wherein the one or more query statements is based on a format comprising at least one of ASCII (American Standard Code for Information Interchange), EBCDIC (Extended Binary-Coded Decimal Interchange Code), Unicode or other character strings, Comma Separated Values (CSV), SGML (Standard Generalized Markup Language), Extensible Markup Language (XML), HyperText Markup Language (HTML), Portable Document Format (PDF), Joint Photographic Experts Group (JPEG), and Graphics Interchange Format (GIF), a word processing document format, a spreadsheet file format, and a presentation file format.

23. The computer-readable medium of claim 19, wherein the ingredient data indicates how the report was generated.

24. The computer-readable medium of claim 19, wherein the report comprises at least one of a graph, a chart, a table, and a spreadsheet, a word processing file, a presentation file, and a text file.

25. The computer-readable medium of claim 19, wherein outputting the report further comprises providing an electronic copy of the report including a verifiable digital signature.

26. The computer-readable medium of claim 25, wherein the electronic copy of the report is configured to include a user selectable element and wherein a module configured to verify the digital signature included with the electronic copy of the report is executed when the user selectable element is selected.

27. The computer-readable medium of claim 26, wherein the module is remotely executable over a network.

\* \* \* \* \*